(12) United States Patent
Murray et al.

(10) Patent No.: US 11,604,018 B1
(45) Date of Patent: Mar. 14, 2023

(54) LOW PRESSURE REFRIGERATION SYSTEM

(71) Applicant: OTG, LLC, Prairie Village, KS (US)

(72) Inventors: John Murray, Denison, TX (US); Jon Saferstein, Shawnee, KS (US)

(73) Assignee: OTG, LLC, Prairie Village, KS (US)

( * ) Notice: Subject to any disclaimer, the term of this patent is extended or adjusted under 35 U.S.C. 154(b) by 239 days.

(21) Appl. No.: 17/026,787

(22) Filed: Sep. 21, 2020

Related U.S. Application Data

(63) Continuation-in-part of application No. 16/408,306, filed on May 9, 2019, now Pat. No. 10,782,053.

(60) Provisional application No. 62/669,164, filed on May 9, 2018.

(51) Int. Cl.
*F25B 41/40* (2021.01)
*B23P 15/26* (2006.01)

(52) U.S. Cl.
CPC .............. *F25B 41/40* (2021.01); *B23P 15/26* (2013.01)

(58) Field of Classification Search
CPC ................................. F25B 41/40; B23P 15/26
See application file for complete search history.

(56) References Cited

U.S. PATENT DOCUMENTS

| | | | |
|---|---|---|---|
| 3,226,949 | A | 1/1966 | Gamache |
| 3,248,895 | A | 5/1966 | Mauer |
| 3,370,438 | A | 2/1968 | Hopkinson |
| 3,427,819 | A | 2/1969 | Seghetti |
| 3,577,742 | A | 5/1971 | Kocher |
| 3,580,006 | A | 5/1971 | Quick |
| 3,719,057 | A | 3/1973 | Grant |
| 4,947,655 | A | 8/1990 | Shaw |
| 4,951,475 | A | 8/1990 | Alsenz |
| 5,586,445 | A | 12/1996 | Bessler |
| 9,677,817 | B1 | 6/2017 | Dudis |
| 2005/0274670 | A1 | 12/2005 | Perriello |
| 2007/0268668 | A1 | 11/2007 | Lin et al. |
| 2009/0077992 | A1 | 3/2009 | Anderson |
| 2009/0211202 | A1 | 8/2009 | Lemme |
| 2014/0034655 | A1 | 2/2014 | Wooldridge et al. |
| 2015/0157030 | A1 | 6/2015 | Giger et al. |
| 2016/0159553 | A1 | 6/2016 | Wooldridge et al. |

(Continued)

OTHER PUBLICATIONS https://en. wikipedia. org/wiki/Refrigeration.

*Primary Examiner* — Ana M Vazquez
(74) *Attorney, Agent, or Firm* — Avek IP, LLC; Kent R. Erickson (57) ABSTRACT

A method is disclosed for cooling a heat transfer fluid circulating in a cooling circuit including a chiller. The method includes installing on the circuit a vacuum housing having a heat exchange conduit extending therethrough and partially filled with a coolant and an atmosphere and pre-cooling the atmosphere and coolant within the vacuum housing to a pre-cooling temperature of between 35 and 60 degrees Fahrenheit using a conventional cooling system. Thereafter the pressure in the vacuum housing is reduced to between 1 and 500 millitorr until an initial cooling temperature in the range of of −50 to 35 degrees Fahrenheit is reached and the heat transfer fluid is then circulated through the heat exchange conduit and to the chiller and back. The pressure reduction in is obtained by selectively connecting the vacuum housing to a larger vacuum reservoir which is connected to a vacuum pump.

20 Claims, 10 Drawing Sheets

(56) References Cited

U.S. PATENT DOCUMENTS

2016/0299443 A1 10/2016 Anderl et al.
2019/0219339 A1* 7/2019 Cave .................... F28D 19/047

* cited by examiner

PRIOR ART

LOW PRESSURE REFRIGERATION SYSTEM

CROSS-REFERENCES TO RELATED APPLICATION

This application is a continuation-in-part of application Ser. No. 16/408,306 filed May 9, 2019 which claims the benefit of U.S. Provisional Application Ser. No. 62/669,164, filed May 9, 2018 which are incorporated herein by this reference.

BACKGROUND OF THE INVENTION

Field of the Invention

The invention relates generally to the field of refrigeration, and in particular, to a low pressure refrigeration system that incorporates a thermo-vessel coil within a vacuum enclosure.

Background Art

Because of cost, environmental issues, and inherent inefficiencies of present compression phase refrigeration systems, it is highly desirable that a new single phase refrigeration systems and methods that operate with less environmental concerns and maximum energy efficiencies, for both commercial and residential buildings, be created. Commercial and residential buildings require refrigeration or cooling of the air inside the building during at least part of the day, in both summer and winter periods, even in climates where winter temperatures are relatively low. This is due both to solar insolation on the building and the internal heat load generated by lighting, equipment and personnel.

Prior art refrigeration systems typically operate on a vapor compression cycle and include, in series, an evaporator, a compressor, a condenser and an expansion valve. In these systems, a circulating refrigerant enters the compressor as a vapor. The vapor refrigerant is compressed and exits the compressor still as a vapor, but at a higher temperature and pressure, while still below the vapor pressure at the exit temperature. The vapor refrigerant travels through the condenser which cools the vapor, condensing the vapor into a liquid by removing additional heat at constant pressure and temperature.

Thereafter, the liquid refrigerant goes through the expansion valve where its pressure abruptly decreases, causing flash evaporation cooling of a portion of the refrigerant converting the refrigerant to a liquid-vapor mixture.

The flash evaporation at the expansion valve results in a mixture of liquid and vapor at a lower temperature and pressure than at the entrance to the expansion valve. The cold, liquid-vapor refrigerant then travels through the evaporator where the remaining liquid is vaporized by heat absorption of the warm air from the room being cooled, i.e. air at the temperature of the room is blown by a fan across the evaporator, which is typically an assembly of tubes and fins. The resulting vapor refrigerant returns to the compressor inlet to repeat the thermodynamic cycle

SUMMARY OF THE INVENTION

The present invention meets a long-felt need in the art by providing a new refrigeration or cooling system which utilizes a thermo-vessel-coil enclosed within a chiller with a coolant solution within said enclosure. The thermo-vessel-coil enclosed within the chiller, has sufficient thermal capacity so as to eliminate the need for compression, expansion, and phase changing coolant, such as Freon gas.

The low pressure refrigeration system of the present invention comprises a closed loop fluid circuit, which includes a thermo-vessel coil, a coolant pump, a fan, a heat exchanger, a coolant regulator valve, and a coolant bypass valve. In one mode of operation, chilled coolant flows from the thermo-vessel coil (enclosed within chiller) through the coolant pump and into the heat exchanger within the space to be cooled. After passing through the heat exchanger, heat saturated coolant is returned to the thermo-vessel-coil within the chiller. In another mode of operation, the bypass valve is responsive to a bypass temperature signal controlled or set by a thermostat control unit. If the temperature of the heat saturated coolant returning from the heat exchanger is below the temperature established by the thermostat, the bypass valve directs the coolant to return to the pump, bypassing the thermo-vessel-coil.

The thermo-vessel-coil of the system is housed within an insulated chiller. The chiller is partially filled with a bath of coolant in which the thermo-vessel coil is submerged. The bath of coolant in the chiller is separate from and does not intermix with the coolant in the fluid circuit. A vacuum supply circuit comprised of a vacuum reservoir (a deep vacuum reservoir), a vacuum pump, a moisture separator and a vacuum regulator valve, is used to keep the chiller in deep vacuum and devoid of heat, which in turn keeps the bath of coolant and the inside temperature of the chiller at a desired temperature, which in turn keeps the coolant in the thermo-vessel coil at a desired temperature. The chiller is initially cooled upon startup only by use of a conventional, vapor compression refrigeration system of the type described previously herein or other refrigeration means now known or later developed. Upon the coolant in the chiller being chilled to a predetermined starting temperature, a vacuum is applied to the chiller and regulated to maintain the temperature of the coolant bath in the chiller. Thereafter, further operation of the conventional cooling system is either not necessary under normal load conditions or only limited use is necessary.

Implementation of the method includes installing in a cooling circuit a vacuum housing having a heat exchange conduit extending therein with a fluid inlet and a fluid outlet for the heat exchange conduit extending through the vacuum housing and the vacuum housing is partially filled with a coolant with a remaining volume of the vacuum housing filled by an atmosphere. The contents of the vacuum housing are pre-cooled to a pre-cooling temperature which is below ambient and in one embodiment may be between 35 and 60 degrees Fahrenheit or between 35 and 50 degrees Fahrenheit. The pre-cooling may be provided by a conventional, vapor compression refrigeration system. After the contents of the vacuum housing are pre-cooled to the pre-cooling temperature, the pressure in the vacuum housing is reduced until an initial cooling temperature of the atmosphere and coolant is reached. The initial cooling temperature preferably ranges between −50 to 35 degrees Fahrenheit or ranges between −40 to 20 degrees Fahrenheit. To achieve the desired temperatures, the pressure in the vacuum housing may be reduced to pressures within the range 0-500 millitorr or within the range of 0 to 100 millitorr or within the range of 0 to 10 millitorr. Thereafter, the method includes circulating a heat transfer fluid between and through a heat exchanger on the fluid circuit and the heat exchange conduit within the vacuum housing wherein the heat transfer fluid is cooled as it passes through the heat exchange conduit.

The vacuum housing is operably connected to a vacuum reservoir which in turn is connected to a vacuum pump. The process includes the steps of selectively connecting the vacuum reservoir to the vacuum source to reduce the pressure within the vacuum reservoir and selectively connecting the vacuum housing to the vacuum reservoir to reduce the pressure in the vacuum housing. In an alternative embodiment an auxiliary vacuum tank is installed on a coolant return line extending from the heat exchanger to the heat exchange conduit in the vacuum housing in flow communication therewith. A volume of the heat transfer fluid is maintained in the auxiliary vacuum tank and the auxiliary vacuum tank is selectively connected to the vacuum reservoir to reduce the pressure in the auxiliary vacuum tank resulting in a reduction in temperature of the coolant therein and to remove any air entrained in the coolant exiting the heat exchanger.

The low pressure refrigeration system of the present invention also features the ability to use new heat exchanger designs for cooling air in a building or space or other cooling applications. Since the system is no longer under extreme pressures to absorb heat and compress gas, and since the system is running only in a single phase, liquid, there is an ability to create new heat exchanger designs which far exceed the efficiencies of present evaporator specifications.

Glycol based coolants are suitable for use within the low pressure refrigeration system of the present invention. Lubrication, anti-wear or anti-corrosion agents may be added to the coolant.

The above and other advantages of the single phase, low pressure refrigeration system of the present invention will be described in more detail below.

DETAILED DESCRIPTION OF THE PREFERRED EMBODIMENTS

The present invention will now be described more fully hereinafter with reference to the accompanying drawings, in which preferred embodiments of the invention are shown. The invention however, may be embodied in many different forms and should not be construed as being limited to the embodiments set forth herein. Rather these embodiments are provided so that this disclosure will be thorough and complete, and will fully convey the scope of the invention to those skilled in the art. Like numbers refer to like elements throughout.

The exemplary embodiment of the present invention is described in terms of use as a single stage, low pressure refrigeration system. However, the apparatus described herein may also be used to implement many different types of cooling, air conditioning, or freezer systems in both residential or commercial applications. (All temperatures referenced in this disclosure are in degrees Fahrenheit. All pressures referenced in this disclosure are in Torr.)

Figure 1:
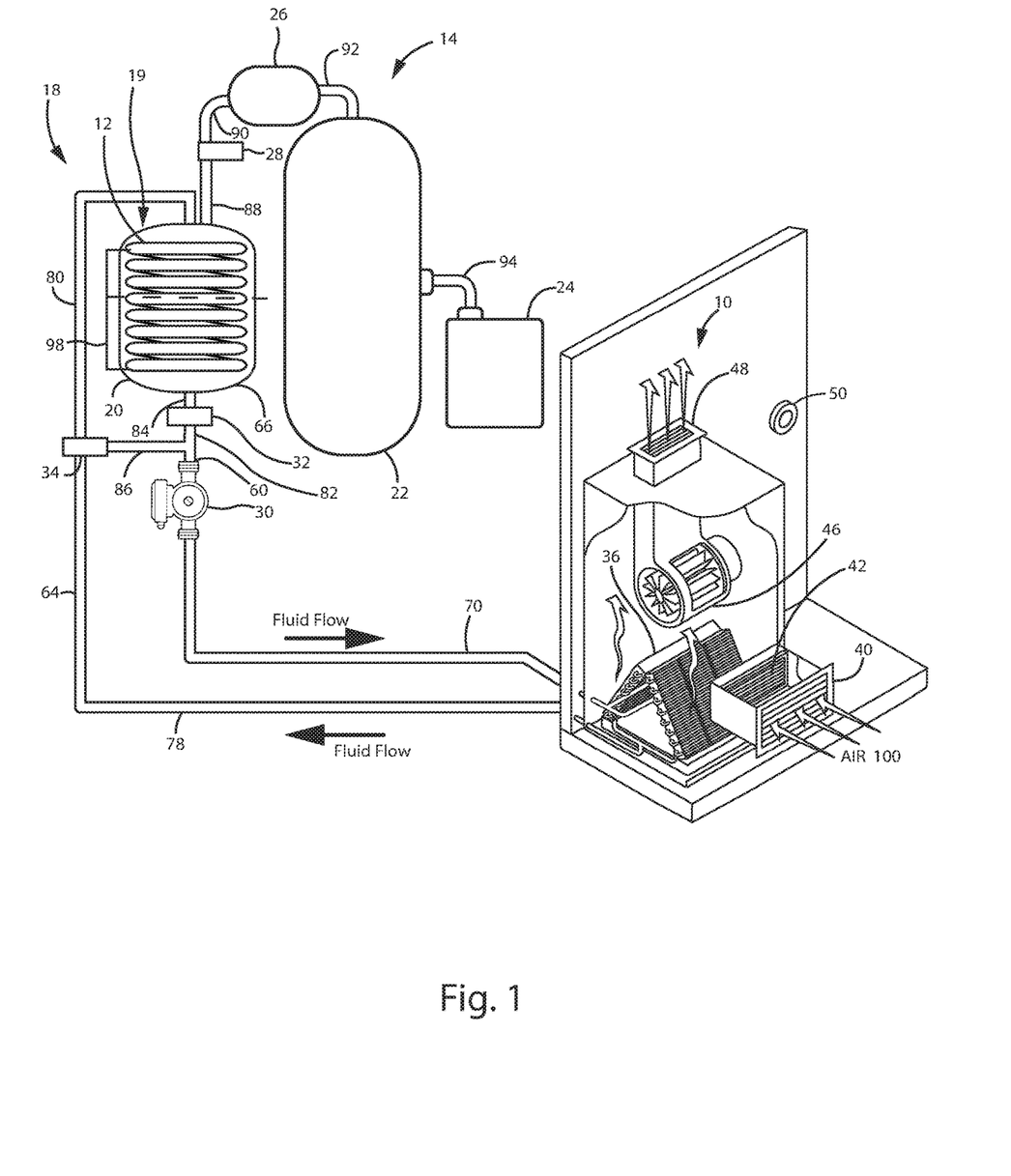
FIG. 1 is a schematic representation of the low pressure refrigeration system of the present invention.

Reference is now made to FIG. 1, which schematically illustrates the single phase, low pressure refrigeration system 10 of the present invention. The system includes a fluid circuit 18 circulating a first coolant 64, a vacuum system assembly 14, and a vacuum pump 24, and a chiller assembly 19 which encases a thermo-vessel-coil assembly 12.

Figure 2:
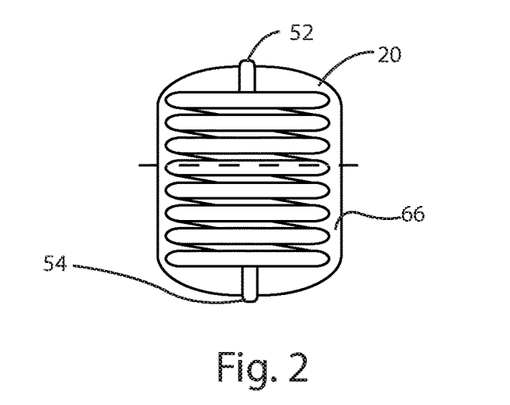
FIG. 2 is a schematic representation of a vacuum housing and thermo-vessel-coil which form part of a chiller assembly of the single phase, low pressure refrigeration system of the present invention.
Figure 3:
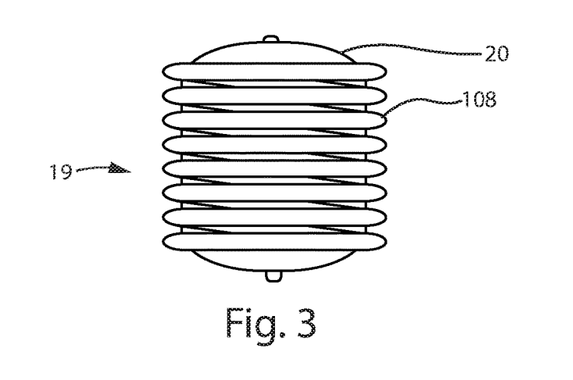
FIG. 3 is a schematic representation of a vacuum housing and thermo-vessel-coil with the addition of pre-cooling coils about the exterior of the vacuum housing.
Figure 4:
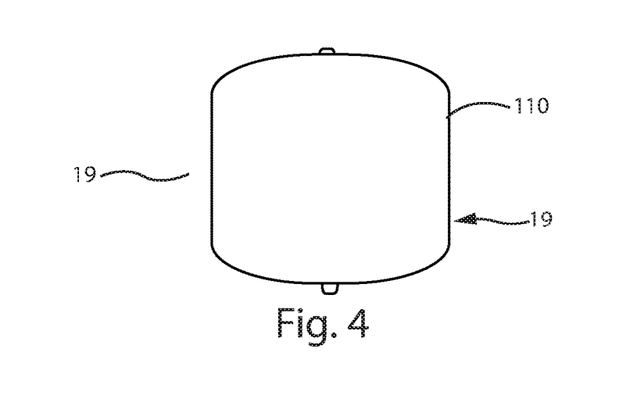
FIG. 4 is a schematic representation the assembly of FIG. 3 with the further addition of insulation about the exterior of the vacuum housing and precooling coils, and which form the completed chiller assembly.

With reference to FIGS. 2-4, the chiller assembly 19 includes a thermo-vessel coil 12 (a tubular coil) housed within a vacuum housing 20. The vacuum housing 20 is fabricated from stainless steel and is shown schematically as a tank. The thermo-vessel coil has a coolant inlet 52 and a coolant outlet 54, which protrude from the vacuum housing 20. The vacuum housing 20 is designed to be partially filled with a second coolant 66 and the thermo-vessel coil 12 is at least partially submerged in the second coolant 66. In the exemplary embodiment, the vacuum housing 20 is filled approximately half full with the second coolant 66 as represented by the dashed line in FIGS. 1 and 2. Other coolant levels may prove practical and desirable depending upon specific applications and further product development.

With reference to FIGS. 1 and 3, a conventional, vapor compression refrigeration system, represented schematically by block 98 is used in the embodiment shown to assist in initially creating a state of deep vacuum for the chiller assembly 19 and allow the second coolant 66 to reach its initial operating temperature. The refrigeration system 98 may also be utilized during periods of high heat loads. In the exemplary embodiment, the refrigeration system 98 is a Freon based, vapor compression refrigeration system and cooling coils 108, carrying a cooled coolant from the refrigeration system 98 are wrapped around the exterior of the vacuum housing 20. The refrigeration system 98 is not limited to a Freon based, vapor compression system. Other types of refrigeration systems are known in the art and may be adapted for use with the cooling system 10 of the present invention. FIG. 4 shows a completed chiller assembly 19, where the vacuum housing 20 has been encased in insulation 110.

System Configuration

In more detail, the fluid circuit 18, comprises the thermo-vessel coil 12 of the chiller assembly 19, a regulator valve 32, a coolant pump 30, an heat exchanger or evaporation coil 36, and a bypass valve 34. The outlet of the thermo-vessel-coil 12 is connected to an inlet of the regulator valve 32 via a coolant supply line 84. An outlet of the regulator valve 32 is connected to an inlet 60 of the coolant pump 30 via coolant supply line 82. The regulator valve 32 controls the volume of the first coolant 64 flowing to the coolant pump 30 and prevents backflow of the first coolant 64 into the thermo-vessel coil 12. The coolant pump 30 has an outlet which is connected to an inlet of the heat exchanger 36 via a coolant supply line 70.

The heat exchanger 36 has an outlet which is connected to an inlet of the bypass valve 34 via a coolant return line 78. An outlet of the bypass valve 34 is connected to the inlet of the thermo-vessel coil 12 via coolant return line 80. Interconnecting the bypass valve 34 with the coolant supply lines 82 and 84 is a bypass line 86.

The vacuum system assembly 14 includes a vacuum reservoir 22 connected to vacuum pump 24 and a moisture separator 26 and a regulator valve connected between the vacuum reservoir 22 and the vacuum housing 20. The vacuum housing 20 is connected to the regulator valve 28 via a vacuum supply line 88. The regulator valve 28 is connected to the moisture separator 26 via vacuum supply line 90. The moisture separator 26 is connected to the vacuum reservoir 22 via a vacuum supply line 92. The vacuum reservoir 22 is connected to the vacuum pump via a vacuum supply line 94. The moisture separator 26 may include a moisture return line (not shown) for returning moisture collected in the moisture separator 26 to the vacuum housing 20 or the collected moisture may be allowed to return to the vacuum housing 20 through supply lines 90 and 88. The vacuum housing 20 is partially filled with the second coolant 66.

Operation of the System

As referenced above, the vacuum housing 20 is partially filled with the second coolant 66. Therefore, the thermo-vessel coil 12 is partially immersed at all times in the second coolant 66. Experimentation has shown that filling the vacuum housing 20 approximately half full with the second coolant 66 provides good system operating characteristics. It should be noted that the thermo-vessel coil 12, pump 30, heat exchanger 36, the regulator valve 32, bypass valve 34 and interconnecting coolant lines form a closed loop system and therefore, the first coolant 64 circulating within the fluid circuit 18 does not intermix with the second coolant 66 contained within the vacuum housing 20.

The vacuum housing 20 is equipped with the refrigeration system 98, which may be a conventional Freon based vapor compression system. In one implementation of the refrigeration system 98, the cooling coils of a Freon based vapor compression system may be embedded within insulation surrounding the vacuum housing 20. The refrigeration system 98 is used only at startup or during periods of high heat load of the cooling system 10 of the present invention. For the cooling system 10 to operate most efficiently, it is necessary to first initially chill the vacuum housing contents, i.e. the air or atmosphere and second coolant 66 included therein, to an initial temperature within the range of about 35 to 50 degrees Fahrenheit to condense the internal air molecules so the vacuum performance is increased allowing the system to achieve deep vacuum into the millitorr range. Once the second coolant 66 in the vacuum housing 20 has been chilled, the pressure is reduced in the vacuum housing 20 to within the range of between 0 to 500 millitorr or 0 to 100 millitorr or 0 to 10 millitorr. The application of a partial vacuum to the vacuum housing 20 will allow reduction of the temperature of the second coolant 66 within the vacuum housing 20 to an initial temperature approaching the freezing point of the first coolant 64 in the thermo-vessel coil which for a glycol based coolant such as an ethylene glycol and water based coolant may approach −49 degrees Fahrenheit. It is therefore foreseen that for an ethylene glycol based coolant, temperatures of the second coolant 66 approaching −49 degrees Fahrenheit may be obtained and utilized for the cooling process.

It should be noted that the initial chilling or pre-cooling of the vacuum housing 20 is only used to condense air molecules so that the vacuum cycle can pull the system into a deep vacuum i.e. to about 1 to 100 millitorr or at least below 500 millitorr. Without the pre-cooling of the atmosphere within the vacuum housing 20, it is believed that the vacuum would never efficiently achieve the desired deep vacuum of millitorr scale necessary to achieve a desired cooling state of −50 to +35 degrees Fahrenheit within the vacuum housing. Therefore, pre-cooling the atmosphere within the vacuum vessel 20 to anything below ambient will assist the vacuum in pulling more air out in a timely manner. Such pre-cooling preferably reduces the pressure in the vacuum vessel 20 to approximately 500 to 1000 millitorr. Thereafter, the atmospheric temperature within the vacuum vessel 20 will drop as the pressure drops without any further assistance from the start-up refrigeration system 98, and the start-up refrigeration unit will shut off as the vacuum reservoir 22 and vacuum pump 24 continue to pull deeper vacuum and thus cooler temperatures, until the desired initial temperature within vacuum housing 20 is achieved. Then the vacuum pump 24 will shut down and will not restart until a preset initial vacuum value is met in the vacuum reservoir 22 based on heat gain within the vacuum housing 20. However, as long as a selected partial vacuum is maintained in the vacuum housing 20, there should be no need to re-utilize the start-up refrigeration system 98.

The chilling of the second coolant 66 is understood to be caused by reducing the pressure in the vacuum housing 20 containing the coolant to 1 to 500 millitorr or 1 to 100 millitorr or 1 to 10 millitorr. The coolant may comprise a glycol based coolant, including for example propylene glycol or ethylene glycol.

The vacuum reservoir 22 disposed between the vacuum pump 24 and the vacuum housing 20 functions as a vacuum reserve which works to initially evacuate the vacuum housing 20 and works to equalize any vacuum lost or offset any increase in pressure in the vacuum housing 20 by heat gain, and works as the vacuum source for the vacuum housing 20 so that the vacuum pump 24 only has to run when additional vacuum or pressure reduction is needed. Experimentation has shown that a volume of the vacuum reservoir 22 approximately twice that of the vacuum housing 20 is sufficient to account for any variance in heat gain and to supply enough vacuum so that the vacuum pump 24 will only need to run on a passive level and not constantly when the system is running. It is important to note here that this system is able to remove heat while the system is not actually running, and is a large distinction from prior art. Prior art systems are either on or off. In the cooling system 10 of the present invention, when the heat gain to the vacuum reservoir 22 exceeds the vacuum setting, then the vacuum pump 24 turns on and evacuates only the vacuum reservoir 22. The vacuum reservoir 22 keeps the vacuum housing 20 in deep vacuum, and does not need to have the vacuum pump 24 continuously on to do so.

The moisture separator 26 disposed between the vacuum housing 20 and the vacuum reservoir 22 is provided because there is a certain amount of moisture in the air present in the housing and the second coolant 66, prior to system startup. Upon the application of vacuum to the vacuum housing 20, any moisture, i.e. water, present in the system flash evaporates upon the application of vacuum. The resulting water vapor needs to be prevented from reaching the vacuum reservoir 22 and, in particular, the vacuum pump 24, to prevent corrosion from occurring over time.

During operation, the coolant pump 30 supplies the first coolant 64 to the inlet of the heat exchanger 36 via the coolant supply line 70. Air 100 from a building to be cooled passes through the heat exchanger 36 where the air is cooled by convection cooling, i.e. by passing over and through the relatively cooler fins and tubes of the heat exchanger 36. The air 100 is drawn through the inlet vent or register 40, (typically equipped with an air filter 42), and expelled through the outlet vent or register 48 by means of the blower assembly 46. The first coolant 64 flowing through the heat exchanger 36 absorbs heat as the air 100 passes over and through the fins of the heat exchanger 36. The now warmed first coolant 64 exits the heat exchanger 36 at an heat exchanger outlet and flows to the bypass valve 34 via the coolant return line 78.

If the temperature of the warmed first coolant 64 returning from the heat exchanger 36 is above a preset temperature, the first coolant 64 is passed through to the thermo-vessel-coil 12 via the coolant return line 80. In the thermo-vessel-coil 12, the first coolant 64 is chilled to approximately –40 to 20 degrees before again passing through the regulator valve 32 and on through the coolant pump 30 and subsequently through the heat exchanger 36.

If the temperature of the warmed first coolant 64 returning from the heat exchanger 36 is below a temperature set by the thermostat 50, the bypass valve 34 opens and the regulator valve 32 closes causing the first coolant 64 to flow directly to the coolant pump 30 via the coolant bypass line 86, thereby bypassing the thermo-vessel-coil 12. The bypassed coolant again flows through the coolant pump 30 and subsequently through the heat exchanger 36. The bypass valve 34 will continue to control the flow of the first coolant 64 so as to bypass the thermo-vessel coil 12, until the temperature of the first coolant 64 exceeds the bypass temperature controlled or set by the thermostat 50.

Glycol based coolants are suitable for use with the low pressure cooling system of the present invention. Lubrication, anti-wear or anti-corrosion agents may also be added to the coolant.

Heat Exchanger Design

Figure 5:
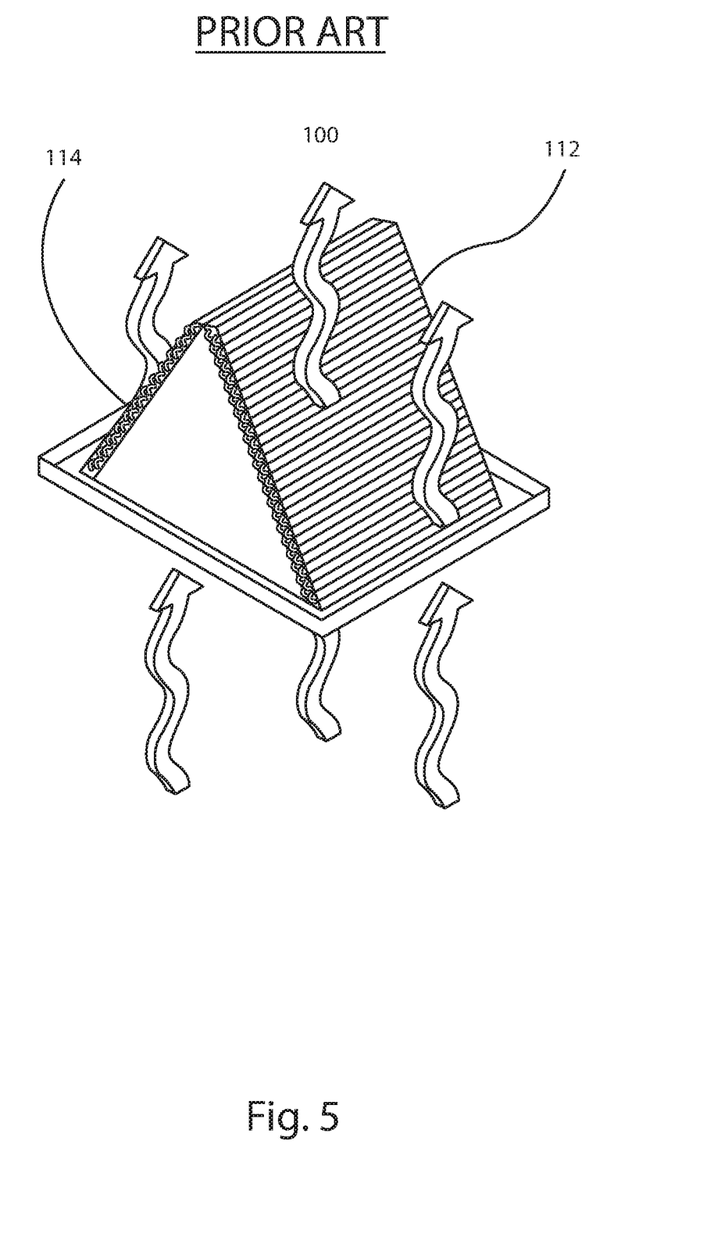
FIG. 5 is a schematic representation of a prior art evaporator.
Figure 6:
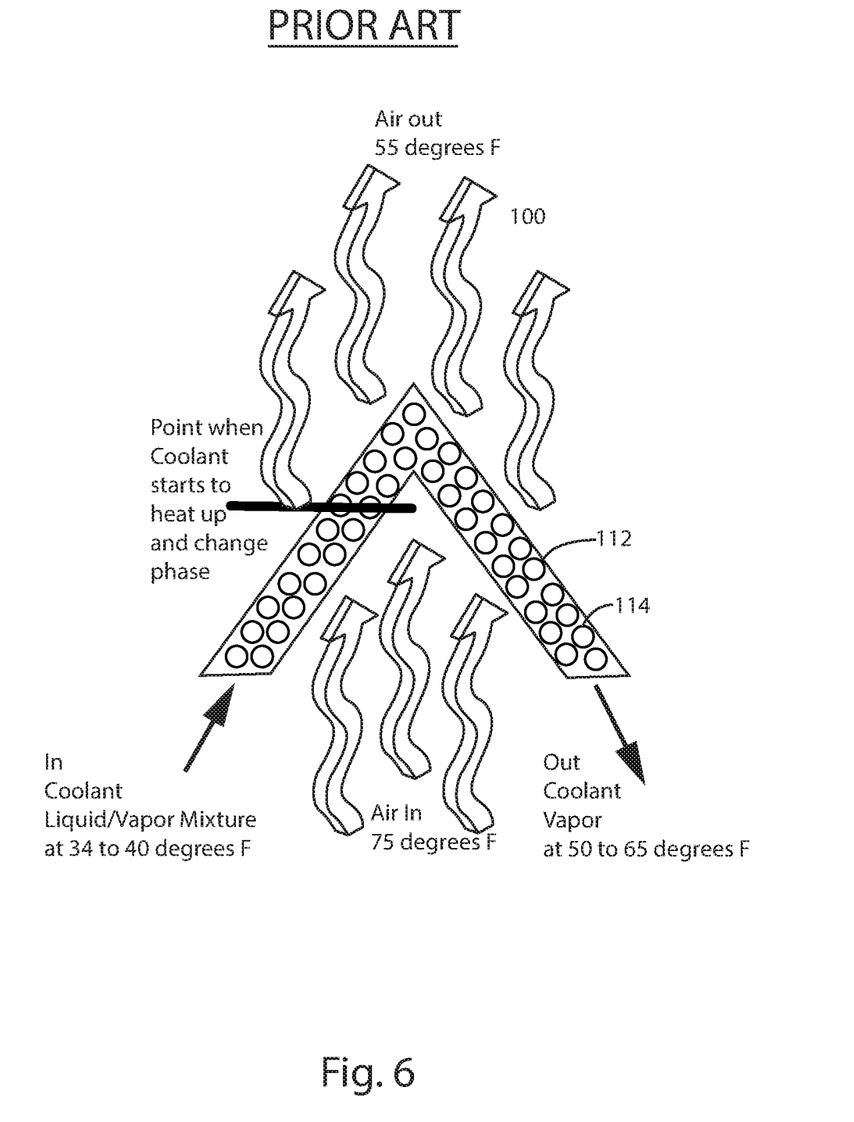
FIG. 6 is another schematic representation of a prior art evaporator.

FIGS. 5-6 show a schematic representation of a conventional prior art evaporator 112. The arrows in FIGS. 5 and 6, indicate air flow. In prior art Freon/compressor type cooling systems, the starting phase of the coolant in the evaporator coils is a liquid/vapor mixture, not a pure liquid. As air flows over the coils, the coolant starts to turn from a liquid/vapor mixture at the coolant inlet to pure vapor as the coils 114 absorb the heat from the air passing over them. As the coolant changes phase to pure vapor, evaporator efficiency decreases as vapor (gas) does not absorb heat as well as a liquid. For this reason, conventional evaporators are able to achieve only about a 20 degree drop in the air temperature as the air flows over the coils.

Typically, less than 50% of the coils will contain coolant in a liquid or liquid-vapor form. The coolant in most of the coils will have changed phase to a gas. As the coils absorb heat from the air, the coolant temperature continues to rise along the line of the coils. A 15° to 30° difference in the coolant temperature at the evaporator inlet and outlet is typical. The coolant moving through prior art evaporators also usually have a fairly high operating pressure as the system relies on pressure and pressure drops and increasing pressure as the coolant changes phases from liquid to vapor, therefore evaporator coils commonly have a diameter of about ⅜" to ½".

Figure 8:
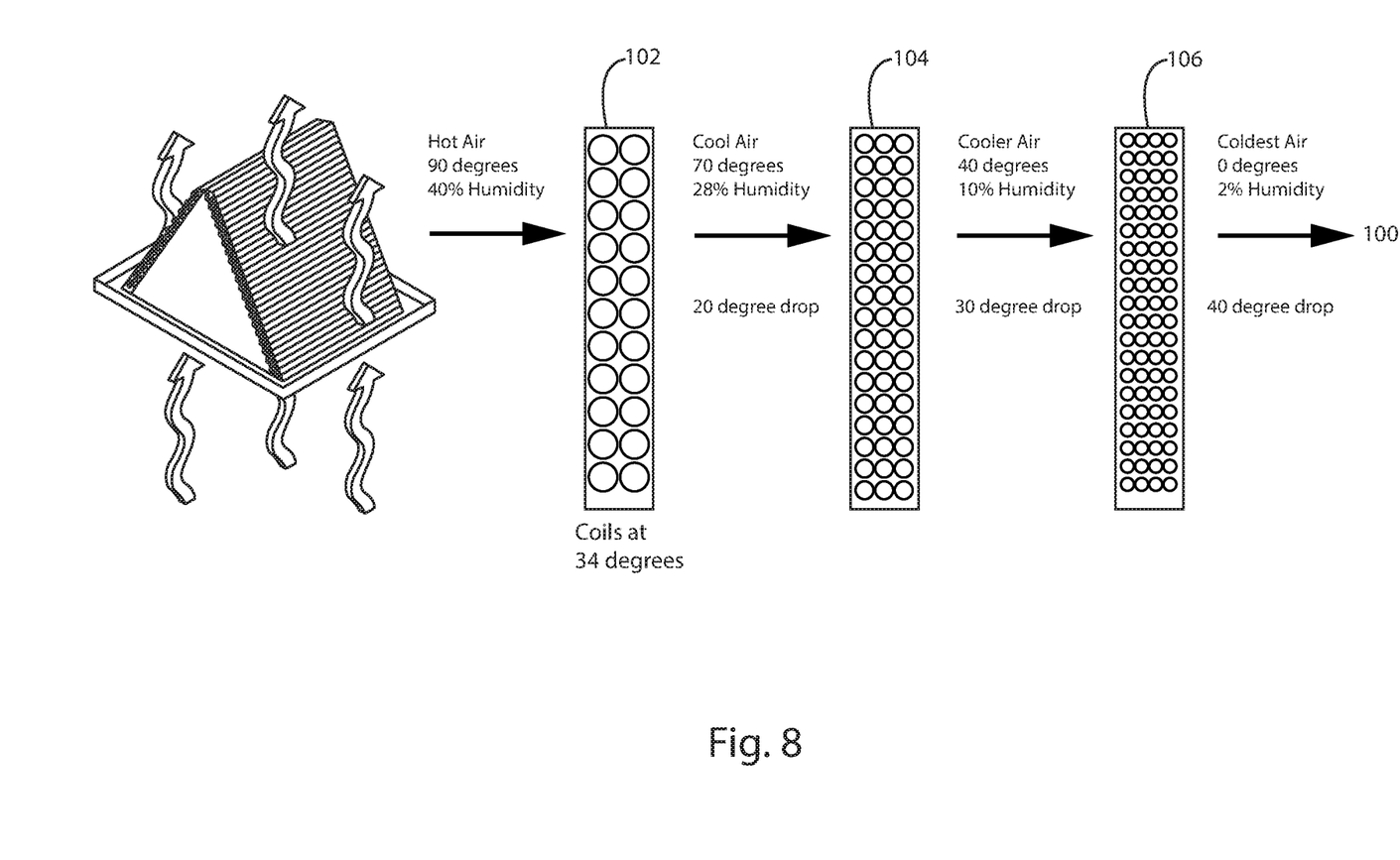
FIG. 8 is a schematic representation of the temperature drop expected to be achievable with a three-core heat exchanger configuration in accordance with the present invention.
Figure 9:
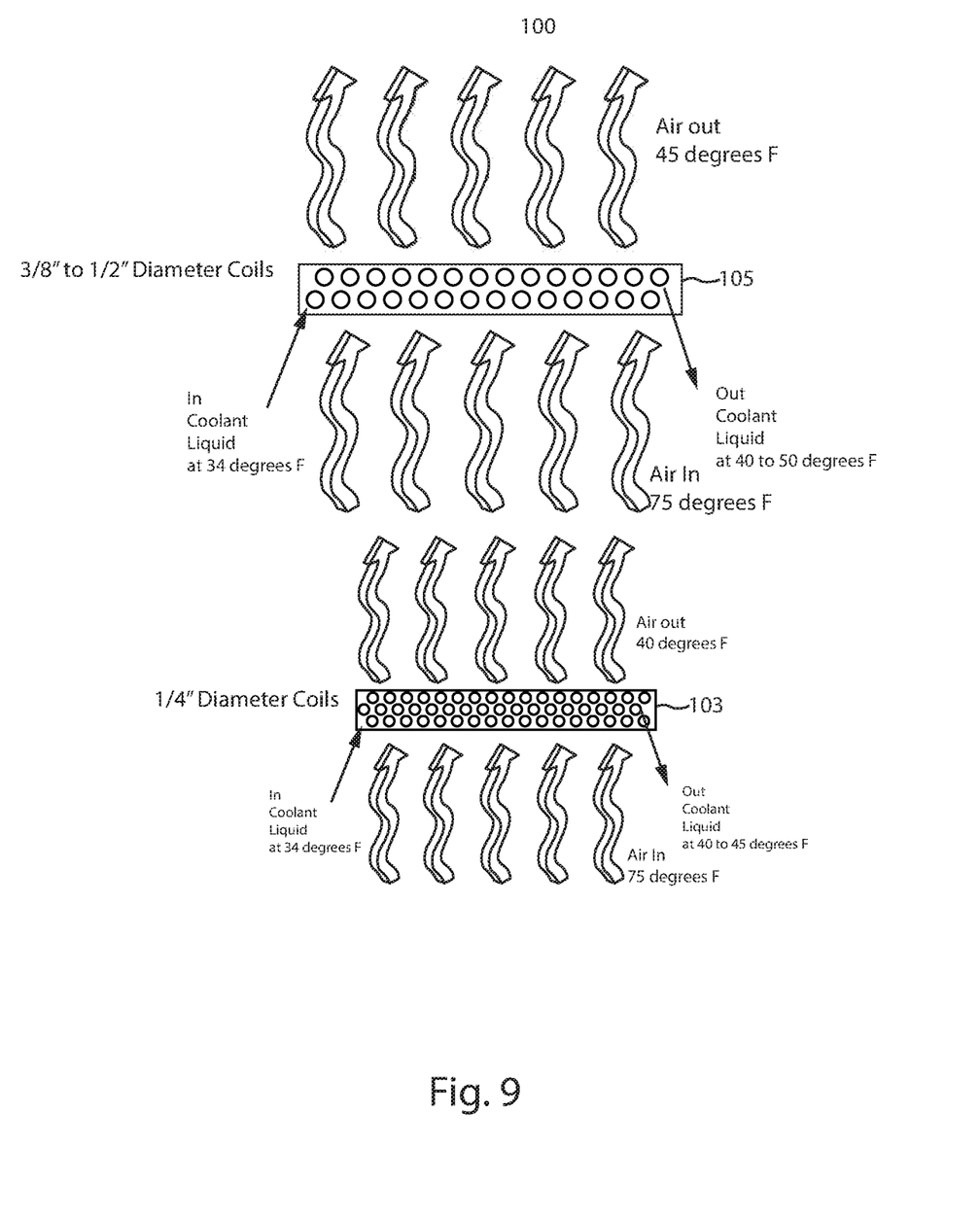
FIG. 9 is a schematic representation of the temperature drop expected to be achievable with particular heat exchanger configurations in accordance with the present invention.

FIGS. 8-9 schematically depict a new multi-pass heat exchanger or heat exchanger coil 36 containing multiple cores, where each core contains one or more rows of tubes, where the tube diameter decreases from core to core, which is preferred in the cooling system 10 of the present invention. The heat exchanger 36 may, however, also be a conventional single pass or single core heat exchanger, i.e. one having a single core of tubes of a constant diameter.

Figure 7:
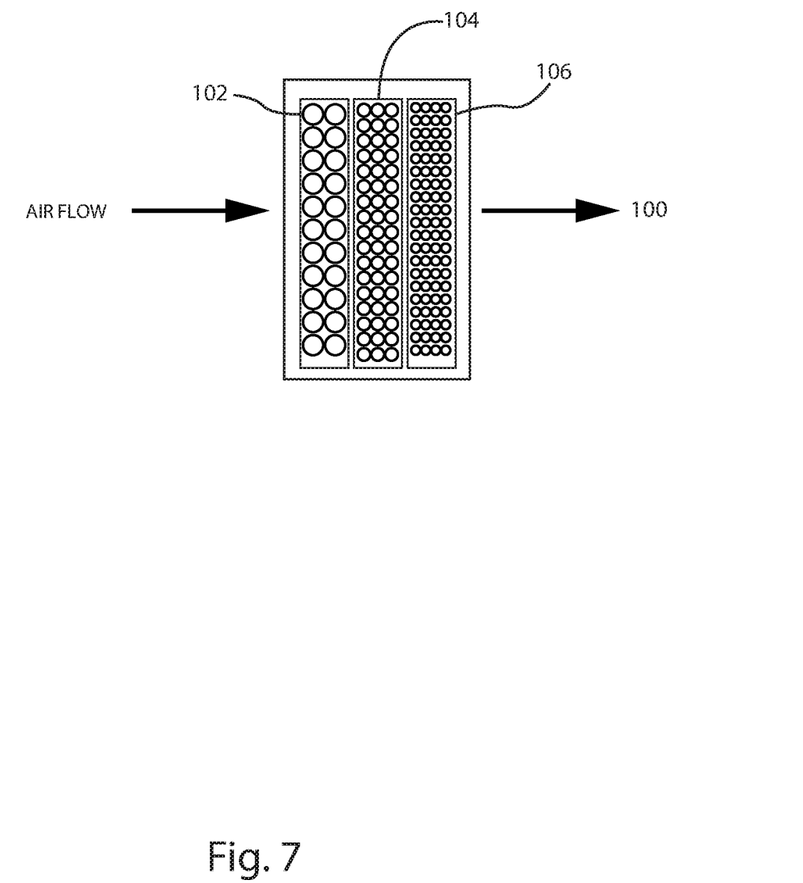
FIG. 7 is a schematic representation of a multi-core, multi-tube heat exchanger suitable for use with the single phase, low pressure refrigeration system of the present invention.

FIG. 7 is a schematic representation of the new multi-pass heat exchanger design containing first, second and third cores of tubes, i.e. cores 102, 104 and 106, respectively. Coolant flows through each of cores 102, 104 and 106 in series. In this design, each succeeding core of tubes contains tubes of a smaller diameter then the proceeding core. Thus, for example, the tubes of core 104 are of a smaller diameter than those of core 102 and the tubes of core 106 are of a smaller diameter than those of core 104. It is expected that the temperature drop experienced by air passing through the three cores of the heat exchanger will increase as the air passes through each core. This design is believed to provide superior cooling to multi-row heat exchangers of conventional design which use multiple cores or rows of tubes, where each core or row contains tubes of the same diameter. FIG. 8 shows the expected temperature drops at each of the three cores 102, 104, and 106 of the heat exchanger depicted in FIG. 7.

The new heat exchanger design presented is believed to be more efficient than previous designs because in the cooling system 10 of the present invention, the coolant or heat exchange fluid flowing through the heat exchanger tubes is always maintained in a liquid state and at lower pressure than coolant in a liquid-vapor state. That is, no phase change from a liquid to a vapor occurs, as is the case with prior art evaporators. Therefore, as the air flows over the cores of tubes (or coils), the coolant maintains its state as a cold liquid. The continuous cold liquid coolant allows for a greater drop in the temperature of the air passing over the tubes or coils, i.e. more heat absorption occurs. It is expected that air temperature will drop about 30 to 40 degrees, as the air flows over the heat exchanger.

Liquid absorbs heat better than either a solid or a vapor (gas). Therefore, in addition to increasing the temperature drop of air passing over or through a bank of tubing, the temperature increase of the coolant in the tubing is decreased over prior art design. The new heat exchanger design presented in this disclosure is believed to be more efficient than prior art designs where the coolant changes phase from a liquid to a gas within the evaporator requiring additional energy to compress the vapor back to a liquid form. In the single phase, low pressure refrigeration system 10 of the present invention, coolant is always flowing at a temperature that is less than the air temperature flowing through the heat exchanger.

Because the present invention cooling system 10 is not dependent on pressure or pressure drops containing coolant in a liquid-vapor or vapor phase, it has the ability to use heat exchangers with a smaller diameter for the tubing or coils than prior art evaporators designed for phase changing coolants. Smaller diameter tubing increases the available surface area, which in turn increases heat absorption of the air flowing over the tubing. This yields a greater drop in air temperature (i.e. more heat absorption), as the air flows over the tubes or coils. It is expected that air temperature drops of 35 to 45 degrees are achievable. Heat exchangers using the principles disclosed above, i.e. multiple cores of tubing where each core uses tubing of a smaller diameter than the preceding core may designed in conventional "A-frame" shape allowing installation in pre-existing air register assemblies. FIG. 9 illustrates the concept that a core or row 103 of smaller diameter tubing will produce a greater temperature drop than a core or row 105 of larger diameter tubing, when a liquid coolant is used.

Figure 10:
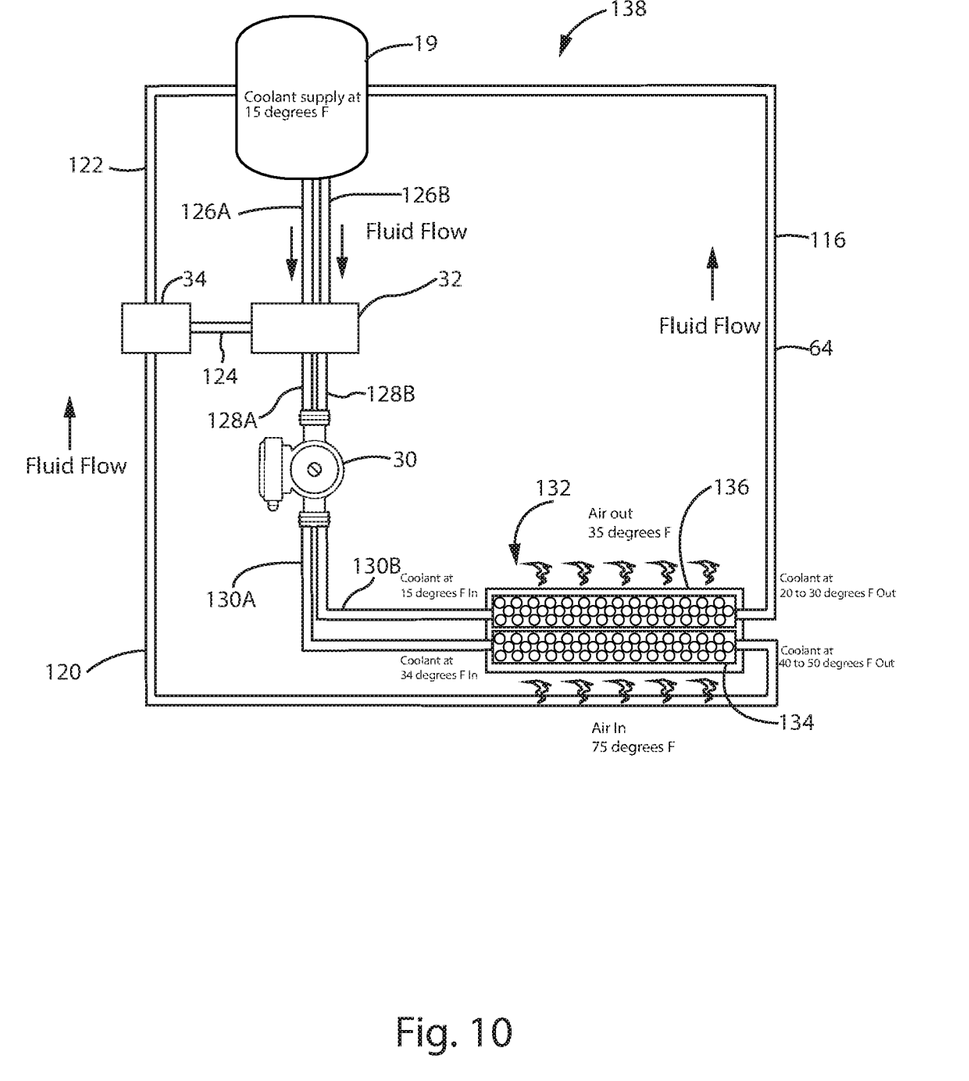
FIG. 10 is a schematic representation of a second embodiment of a fluid circuit suitable for use in the single phase, low pressure refrigeration system of the present invention.

Referring now to FIG. 10, a second embodiment of a fluid circuit 138 of the cooling system 10 of the present invention is presented. This fluid circuit 138 differs from the fluid circuit 18 of the embodiment presented in FIG. 1, principally in that it incorporates a double feed heat exchanger 132. The double feed heat exchanger 132 includes first and second heat exchanger cores 134 and 136, comprised of a series of tubes, where each heat exchanger core is independently supplied with the first coolant 64 and where each heat exchanger core independently returns warmed second coolant to the chiller 19.

In the fluid circuit 138, the coolant pump 30 supplies the first evcoil core 132 with cold first coolant 64 via supply line 130A. Subsequently, warmed first coolant 64 from first heat exchanger core 132 is returned to the bypass valve 34 via return line 120. From the bypass valve 34, warmed first coolant 64 may be directed to back to the chiller 19 via return line 122 or may be bypassed back to the coolant pump 30 via bypass line 124. The coolant pump 30 provides cold first coolant 64 to the second heat exchanger core 136 via a separate supply line 130b. Warmed first coolant 64 exiting the second heat exchanger core 136 is returned to the chiller 19 via independent return line 116. In this configuration, warmed first coolant 64 from the second heat exchanger core 136 cannot be bypassed back to the coolant pump 30.

The fluid circuit 138 in more detail is as follows. Supply line 126a supplies cold first coolant 64 from the chiller 19 to the regulator valve 32. Supply line 128a supplies cold first coolant 64 from the regulator valve 32 to coolant pump 30. Supply lines 126a and 128a, in conjunction with supply line 130a, feed or supply the first heat exchanger core 134 with cold first coolant 64. Similarly, supply line 126b supplies cold first coolant 64 from the chiller 19 to the regulator valve 32. Supply line 128b supplies cold first coolant 64 from the regulator valve 32 to the coolant pump 30. Supply lines 126b and 128b, in conjunction with supply line 130b, feed or supply the second heat exchanger core 136.

In the fluid circuit 138, the chiller 19 is configured to supply first coolant 64 at an initial temperature, for example of about 15 degrees. Thus, coolant at the initial temperature is supplied directly to the second heat exchanger core 136. After initial startup, first coolant 64 supplied to the first heat exchanger core 132 is regulated to be supplied at a second temperature, for example 34 degrees. This arrangement causes a greater air temperature drop across the second heat exchanger core 136 than across the first heat exchanger core 134. The fluid circuit 138 may be used to provide greater flexibility in controlling the temperature of the air to be cooled.

Figure 11:
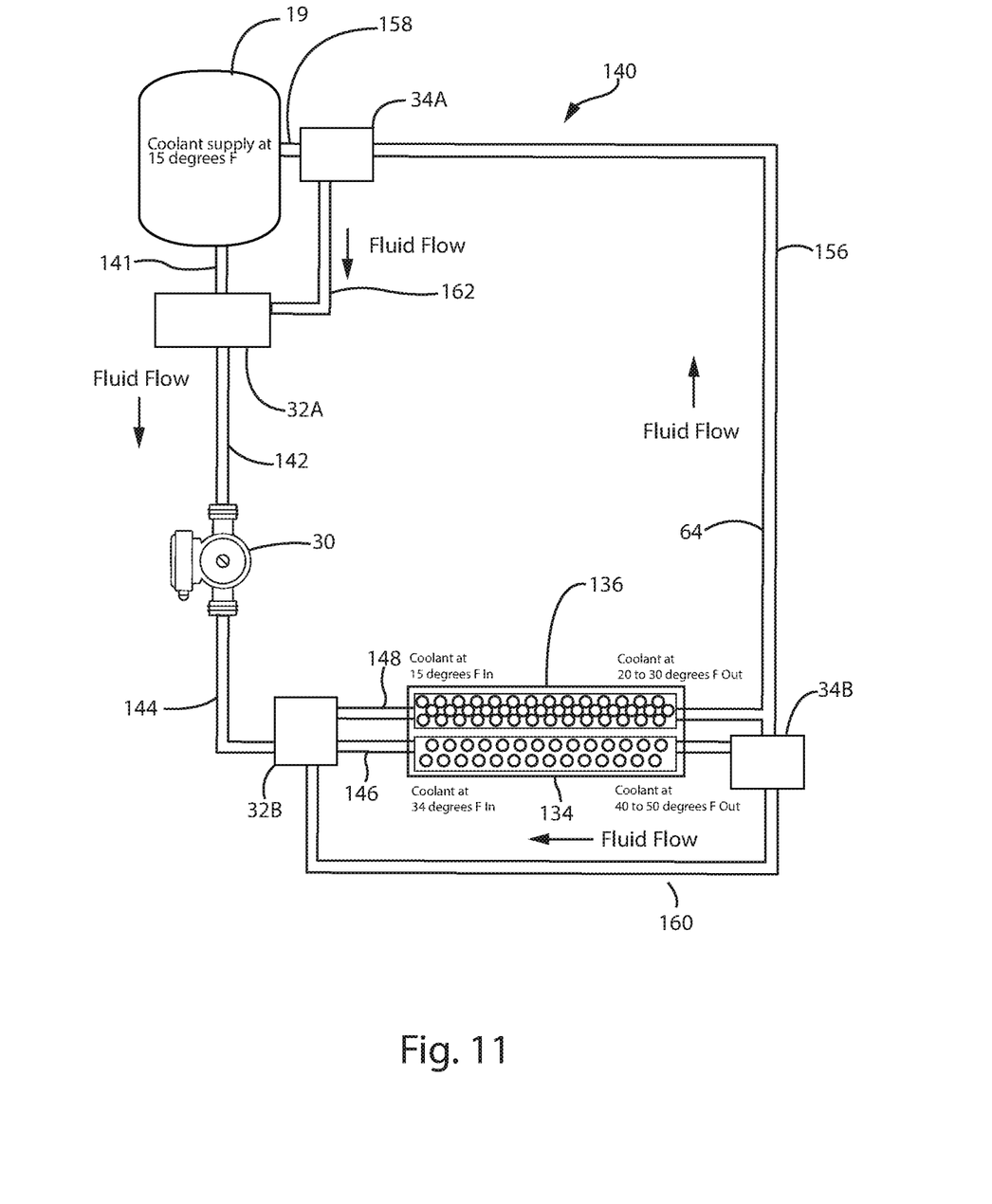
FIG. 11 is a schematic representation of a third embodiment of a fluid circuit suitable for use in the single phase, low pressure refrigeration system of the present invention.

Referring now to FIG. 11, a third embodiment of a fluid circuit 140 of the cooling system 10 of the present invention is presented. Fluid circuit 140 differs from the previously presented fluid circuits in that first coolant 64 from the chiller 19 is initially supplied to both the first heat exchanger core 134 and the second heat exchanger core 136 at an initial coolant temperature established by the chiller 19. Thereafter, warmed coolant second 64 may be bypassed in the heat exchanger 132 at an outlet of the first heat exchanger core 134 and returned to inlets of both the first and second heat exchanger cores 134 and 136, by a first bypass loop line 160. Both the first and second heat exchanger cores 134 and 136 return first coolant 64 to the chiller 19 via a return line 156. At the chiller 19, returned first coolant 64 may again be bypassed and returned to the coolant pump 30, by a second bypass loop line 162.

In more detail, in the fluid circuit 140, the chiller 19 connects to a first regulator valve 32a via supply line 144. Supply line 142 interconnects the first regulator valve 32a with the coolant pump 30. The coolant pump 30 is connected to a second regulator valve 32b via supply line 144. Second regulator valve 32b feeds or supplies an inlet of the first heat exchanger core 134 via supply line 146 and an inlet of the second heat exchanger core 136 via supply line 148. An outlet of the first heat exchanger core 134 is connected to the second bypass valve 34b via return line 150. The second bypass valve 34b connects to second regulator valve 32b via bypass line 152. Second bypass valve 34b connects to first bypass valve 34a via a common return line 156. First bypass valve 34a connects to the chiller 19 via line 158. An outlet of the second heat exchanger core 136 connects to the common return line 156 via line 154.

Like fluid circuit 138, fluid circuit 140 allows for the provision of coolant 64 at one temperature to the inlet of the second heat exchanger core 136 and at a second warmer temperature (after initial startup) to the inlet of the first heat exchanger core 134. Like fluid circuit 138, fluid circuit 140 may also may be used to provide greater flexibility in controlling the temperature of the air to be cooled.

In summary, the single phase, low pressure air conditioning or refrigeration system 10 of the present invention maintains the coolant 66 in the vacuum housing 20 at a desired temperature, by using a vacuum system to greatly reduce the pressure in the vacuum housing. A vacuum pump 24 is used to evacuate the vacuum reservoir 22 of air, which when connected to the vacuum housing 20 will reduce the pressure therein. A conventional refrigeration system is used to initially chill or pre-cool the coolant in the vacuum housing 20 (i.e. the second coolant 66), so that the vacuum housing 20 can achieve a state of deep vacuum.

The entire system can continuously keep the vacuum vessel at a desired temperature by running the vacuum pump minimally. Therefore, the entire cooling system 10 can remain always on. Also, since the first and second coolants 64 and 66 do not contain Freon, Freon contamination is eliminated, which in turn eliminates acid build up, corrosion, and motor winding delamination within the entire closed loop system. The cooling system 10 of the present invention also eliminates the inefficient design and of present AC systems which require a compressor and expansion valve and which are required to cause a refrigerant such as Freon to transition from a cold liquid to a hot gas and back to a cold liquid. It is believed that even if the system of the present invention were to be run continuously, dramatic electrical savings would be attained in comparison to a conventional cooling system.

Figure 12:
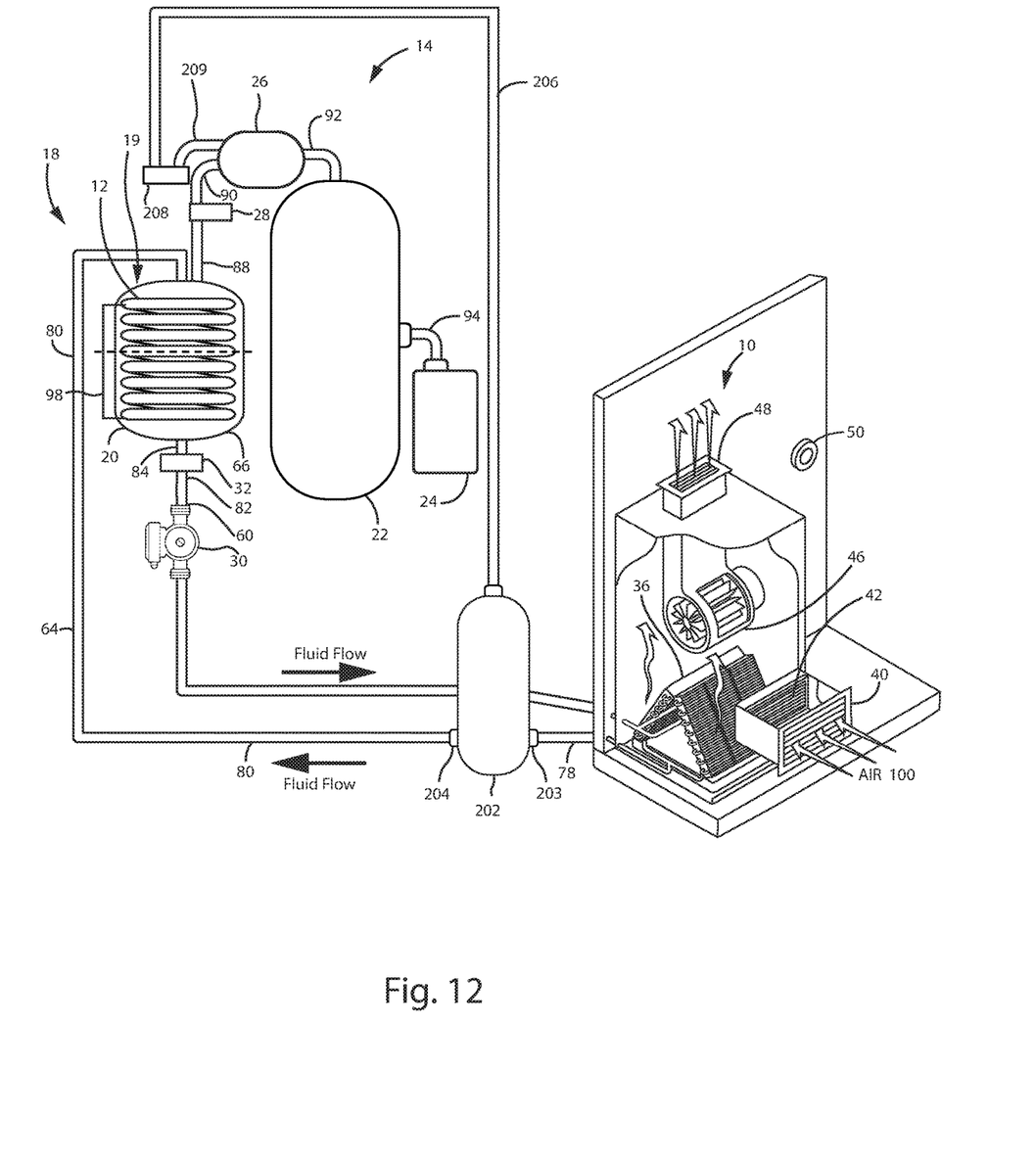
FIG. 12 is a schematic representation of a modified version of the first embodiment of the low pressure refrigeration system of the present invention.

A modified version of the low-pressure cooling system 10 as shown in FIG. 1 is shown in FIG. 12. The cooling system 10 of FIG. 1, is modified to allow selective and/or intermittent reduction of the pressure in coolant return line 78 and 80 to cause the temperature of the coolant 64 in coolant return line 78 and 80 to drop and to allow for the removal of air or other gasses from the coolant 64. An auxiliary vacuum tank 202 is connected between coolant return line 78 and coolant return line 80 and partially filled with coolant 64 with an upper volume of the auxiliary vacuum tank 202 filled with an atmosphere. Coolant return line 78 extends between an outlet to heat exchanger 36 and auxiliary vacuum tank 202 and is connected to an inlet 203 to the auxiliary vacuum tank 202 at a lower end thereof. Coolant return line 80 is connected at a first end to an outlet 204 of the auxiliary vacuum tank 202 at a lower end thereof and at an opposite end to the inlet 52 to the thermo-vessel coil 12. Coolant supply line 70 bypasses auxiliary vacuum tank 202. Auxiliary vacuum tank 202 is connected to vacuum reservoir 22 by auxiliary vacuum supply line 206 connected between the vacuum tank 202 and a vacuum regulator 208 which is connected by a vacuum supply line 209 to the moisture separator 26 which is connected to the vacuum reservoir by vacuum tank 22. Vacuum supply line 206 is connected to and opens into auxiliary vacuum tank 202 at an upper end thereof.

The pressure in auxiliary vacuum tank 202 is selectively lowered by selectively opening and then closing auxiliary regulator valve 208 to connect the auxiliary vacuum tank 202 to the vacuum reservoir 22. Reducing the pressure in the auxiliary vacuum tank 202 results in a reduction of the temperature of the contents of the auxiliary vacuum tank 202 including the first coolant 64 and the atmosphere therein and prior to circulation of the first coolant 64 out of the auxiliary vacuum tank 202 and back to the thermo-vessel coil 12. First coolant 64 passing through thermo-vessel coil 12 is further cooled by the second coolant 66 surrounding the thermo-vessel coil 12 in vacuum housing 20. Any air or gasses in the first coolant 64 as it enters into the auxiliary vacuum tank 202 will rise to the upper portion of the tank 202 removing the air or gasses from the first coolant 64 thereby increasing the efficiency of the first coolant 64 for removing heat when circulated back to the heat exchanger 36.

While the present invention has been described with regards to particular embodiments, it is recognized that additional variations of the present invention may be devised without departing from the inventive concept.

The invention claimed is:

1. A method of cooling a heat transfer fluid comprising:
   installing a vacuum housing having a heat exchange conduit extending therein with a fluid inlet and a fluid outlet for the heat exchange conduit extending through the vacuum housing and the vacuum housing is partially filled with a coolant with a remaining volume of the vacuum housing filled by an atmosphere;
   reducing the pressure in the vacuum housing to reduce the temperature of the coolant therein until an initial cooling temperature of the coolant is reached; and
   circulating the heat transfer fluid between and through a heat exchanger and the heat exchange conduit within the vacuum housing wherein the heat transfer fluid is cooled as it passes through the heat exchange conduit.

2. The method as in claim 1, wherein the step of reducing the pressure in the vacuum housing comprises reducing the pressure to within a range of 1 to 500 millitorr.

3. The method as in claim 1, wherein the step of reducing the pressure in the vacuum housing comprises reducing the pressure to within a range of 1 to 100 millitorr.

4. The method as in claim 1 wherein the step of reducing the pressure in the vacuum housing until an initial cooling temperature of the coolant is reached comprises reducing the pressure within the vacuum housing until the initial cooling temperature of the coolant within the vacuum housing is within a range of −50 to 35 degrees Fahrenheit.

5. The method as in claim 1 further comprising the step of collecting moisture drawn from the vacuum housing in a moisture separator.

6. The method as in claim 1 further comprising the step of selectively reducing the pressure of the heat transfer fluid as it flows from the heat exchanger to the heat exchange conduit within the vacuum housing.

7. A method of cooling a heat transfer fluid comprising:
   installing a vacuum housing having a heat exchange conduit extending therein with a fluid inlet and a fluid outlet for the heat exchange conduit extending through the vacuum housing and the vacuum housing is partially filled with a coolant with a remaining volume of the vacuum housing filled by an atmosphere;
   pre-cooling the vacuum housing and the atmosphere and the coolant within the vacuum housing to a pre-cooling temperature that is below the ambient temperature;
   reducing the pressure in the vacuum housing to further reduce the temperature of the coolant therein; and
   circulating the heat transfer fluid between and through a heat exchanger and the heat exchange conduit within the vacuum housing wherein the heat transfer fluid is cooled as it passes through the heat exchange conduit.

8. The method as in claim 7 wherein the pre-cooling step comprises cooling the atmosphere and the coolant within the vacuum housing to an initial temperature that is between 35 and 60 degrees Fahrenheit.

9. A method of cooling a heat transfer fluid comprising:
   installing a vacuum housing having a heat exchange conduit extending therein with a fluid inlet and a fluid outlet for the heat exchange conduit extending through the vacuum housing and the vacuum housing is partially filled with a coolant with a remaining volume of the vacuum housing filled by an atmosphere;
   installing a vacuum reservoir;
   selectively connecting the vacuum reservoir to a vacuum source to reduce the pressure within the vacuum reservoir; and
   selectively connecting the vacuum housing to the vacuum reservoir to reduce the pressure in the vacuum housing to reduce the temperature of the coolant therein
   circulating the heat transfer fluid between and through a heat exchanger and the heat exchange conduit within the vacuum housing wherein the heat transfer fluid is cooled as it passes through the heat exchange conduit.

10. The method as in claim 9 wherein the step of installing a vacuum reservoir comprises installing a vacuum reservoir having a volume at least two times the volume of the vacuum housing.

11. The method as in claim 9 further comprising the steps of:
   installing an auxiliary vacuum tank on a coolant return line extending from the heat exchanger to the heat exchange conduit in the vacuum housing in flow communication therewith;
   maintaining a volume of the heat transfer fluid in the auxiliary vacuum tank; and
   selectively connecting the auxiliary vacuum tank to the vacuum reservoir to selectively reduce the pressure within the auxiliary vacuum tank.

12. A method of cooling a heat transfer fluid comprising:
   installing a vacuum housing having a heat exchange conduit therein with a fluid inlet and a fluid outlet of the heat exchange conduit extending through the vacuum housing and the vacuum housing is partially filled with a coolant surrounding at least a portion of the heat exchange conduit with a remaining volume of the vacuum housing filled by an atmosphere;

installing a vacuum reservoir connected to a vacuum pump wherein the vacuum reservoir has a volume that is greater than the volume of the vacuum housing and connecting the vacuum reservoir to the vacuum housing through a vacuum supply line having a pressure regulating valve connected to the vacuum supply line between the vacuum reservoir and the vacuum housing;

pre-cooling the vacuum housing and the atmosphere and the coolant within the vacuum housing to a pre-cooling temperature; and reducing the pressure in the vacuum housing until an initial cooling temperature of the atmosphere and the coolant is reached by operably connecting the vacuum housing with the vacuum reservoir through the pressure regulating valve and operating the vacuum pump as needed until the temperature of the atmosphere and the coolant within the vacuum housing reaches the initial cooling temperature;

circulating the heat transfer fluid between a heat exchanger and the heat exchange conduit within the vacuum housing wherein the heat transfer fluid is cooled as it passes through the heat exchange conduit resulting in an increase in temperature of the coolant and the atmosphere within the vacuum housing; and at least intermittently reducing the pressure in the vacuum housing by operably connecting the vacuum housing with the vacuum reservoir through the pressure regulating valve and operating the vacuum pump as needed until the temperature of the atmosphere and the coolant within the vacuum housing returns to the initial cooling temperature.

13. The method as in claim 12 wherein the pre-cooling step comprises cooling the atmosphere and the coolant within the vacuum housing to a pre-cooling temperature that is below the ambient temperature.

14. The method as in claim 12 wherein the pre-cooling step comprises cooling the atmosphere and the coolant within the vacuum housing to an initial temperature that is between 35 and 60 degrees Fahrenheit.

15. The method as in claim 12, wherein the step of reducing the pressure in the vacuum housing comprises reducing the pressure to within a range of 1 to 500 millitorr.

16. The method as in claim 12, wherein the step of reducing the pressure in the vacuum housing comprises reducing the pressure to within a range of 1 to 100 millitorr.

17. The method as in claim 12 wherein the step of reducing the pressure in the vacuum housing until an initial cooling temperature is reached comprises reducing the pressure within the vacuum housing until the temperature of the atmosphere and the coolant within the vacuum housing is within a range of −50 to 35 degrees Fahrenheit.

18. The method as in claim 12 wherein the step of providing a vacuum reservoir comprises providing a vacuum reservoir having a volume at least two times the volume of the vacuum housing.

19. The method as in claim 12 further comprising the step of selectively reducing the pressure of the heat transfer fluid as it flows from the heat exchanger to the heat exchange conduit within the vacuum housing.

20. The method as in claim 12 further comprising the steps of:

installing an auxiliary vacuum tank on a coolant return line extending from the heat exchanger to the heat exchange conduit in the vacuum housing in flow communication therewith;

maintaining a volume of the heat transfer fluid in the auxiliary vacuum tank; and selectively connecting the auxiliary vacuum tank to the vacuum reservoir to selectively reduce the pressure within the auxiliary vacuum tank.

\* \* \* \* \*